United States Patent [19]

Siligoni et al.

[11] Patent Number: 4,800,589

[45] Date of Patent: Jan. 24, 1989

[54] VOLTAGE REGULATOR CONTROL CIRCUIT FOR A SUBSCRIBER LINE INTERFACE CIRCUIT

[75] Inventors: Marco Siligoni, Milan; Vanni Poletto, Alessandria, both of Italy

[73] Assignee: SGS-Thomson Microelettronica S.p.A., Italy

[21] Appl. No.: 109,435

[22] Filed: Oct. 16, 1987

[30] Foreign Application Priority Data

Oct. 24, 1986 [IT] Italy ................. 22140-A/86

[51] Int. Cl.$^4$ ................................ H04M 19/00
[52] U.S. Cl. ............................ 379/413; 379/387
[58] Field of Search ............... 379/324, 345, 387, 398, 379/399, 405, 413

[56] References Cited

U.S. PATENT DOCUMENTS 4,476,350  10/1984  Aull et al. .................... 379/413 X Primary Examiner—Eugene R. LaRoche
Assistant Examiner—Steven J. Mottola
Attorney, Agent, or Firm—Jones, Askew & Lunsford

[57] ABSTRACT

A Subscriber Line Interface Circuit (SLIC) having a voltage regulator for application thereto of a DC supply voltage $V_B$ and connected at the output terminals to an audio transmission line to provide a line current $I_L$ and voltage $V_L$ for a given resistance load $R_L$ on the line, is provided with a control circuit which, by picking up appropriate current and voltage values from the interface circuit, outputs a voltage value which is the equal of the difference between an optimum supply voltage $V_{BF}$ and the supply voltage $V_B$. The control circuit output is connected to the voltage regulator to minimize the voltage $V_{BFK}$ applied to the interface circuit as the transmission line resistance load $R_L$ varies, thus minimizing the power dissipated through the interface circuit.

9 Claims, 4 Drawing Sheets

VOLTAGE REGULATOR CONTROL CIRCUIT FOR A SUBSCRIBER LINE INTERFACE CIRCUIT

DESCRIPTION

This invention relates to a voltage regulator control circuit for a Subscriber Line Interface Circuit (SLIC), which has output terminals connected to the subscriber line and having, in their steady-state condition, a so-called "line current/voltage" characteristic described by a continuous straight segment function wherein a first segment at a steady current equal to the line peak or upper limit current merges with a second sloping segment merging, in turn, with a third sloping segment, the gradients of said segments being dependent on the value of a bridge resistance in the interface circuit, and said characteristic depending on the supply voltage value from said voltage regulator.

As is known, in the field of audio transmissions over telephone lines, the transmission line requires to be connected to and driven by an interfacing circuit, usually of the integrated type.

Such an interface circuit, which may be of a type referred to in the trade as multifunctional AMD Am 7950 SLIC, can supply, at its output terminals connected to the transmission line, a line voltage $V_L$ and a line current $I_L$ for any given line resistance load, such as the load represented by a resistance $R_L$.

The above-outlined SLIC-type interface circuit is also connected to a voltage regulator which supplies a voltage $V_B$ at a high efficiency rate from a rated battery voltage $V_{BN}$.

It has been common for the low-tension control device of the SLIC interface circuit to output a voltage value, denoted $V_{FBK}$, which is supplied to the voltage regulator as an informative parameter of what is taking place on the transmission line, thereby the supply voltage $V_B$ can be suitably backregulated.

For instance, where the transmission line is connected to a decade pulser, continued switching of the line from an open circuit condition to a closed circuit condition would be experienced, which results in large fluctuations of the resistance load $R_L$ on the line.

Prior proposals have provided for feedback connection in the interface circuit of a voltage regulator including an integrator exhibiting a time constant RC. Such a voltage regulator enables sharp variations in the line voltage due to changes in the transmission line resistance load, e.g. as brought about by switch-overs from decade pulsers, to be followed.

However, it has been found that where a conventional type of voltage regulator alone is used the SLIC interface circuit is supplied a higher voltage $V_B$ than that strictly required to maintain on the transmission line the line voltage $V_L$ and current $I_L$ values dictated by any given line load $R_L$.

More specifically, the SLIC interface circuit exhibits, at its output terminals connected to the transmission line, a line current/line voltage characteristic represented by a straight segment continuous function comprising a first segment at a steady current equal to the line peak current $I_{LIM}$, which merges with a segment having a gradient of $1/R_{DC}$, where $R_{DC}$ is the bridge resistance of the SLIC interface circuit, in turn merging with a segment with gradient of $n/R_{DC}$ meeting the line voltage axis, n being a positive integer.

The above characteristic is completed by a segment of the voltage axis which joins the meet point with the line of gradient $n/R_{DC}$ to a voltage value equal to the supply voltage $V_B$; the length of the last-mentioned segment is $V_{drop}$, which represents the least difference between the supply voltage $V_B$ and the line voltage $V_L$.

Research work carried out by the Applicant has shown that if the supply voltage $V_B$ is decreased, the steady current segments with gradient $1/R_{DC}$ stay as they are, whereas the remaining segments are shifted in parallelism.

Accordingly, should it be possible to supply the SLIC interface circuit with a so-called optimum voltage $V_{BF}$ while leaving the line voltage and current values at the output terminals unaltered for a given line load, then the power dissipated in the SLIC interface circuit could be minimized.

The technical problem on which this invention is based is one of providing a control circuit, for a voltage regulator in a subscriber line interface circuit, or SLIC-type circuit, which can supply to said voltage regulator a voltage value $V_{FBK}$ given by the difference between the optimum voltage value $V_{BF}$, as supplied to the interface circuit, and the supply voltage $V_B$ such that the optimum voltage $V_{BF}$ can have the least possible value for any given line load, thus obviating the aforementioned drawbacks.

This problem is solved by a control circuit as specified above and defined in the appended claim 1.

The problem is further solved by control circuit as specified above and defined in the appended claim 2.

Also, according to the invention, the above technical problem is solved by combining the above features together and as defined in the characterizing part of the appended claim 3.

Further features and the advantages of the control circuit according to this invention will be more clearly understood from the following detailed description of a preferred embodiment thereof, to be taken by way of illustration and not of limitation in conjunction with the accompany drawings.

In the drawings

Figure 1:
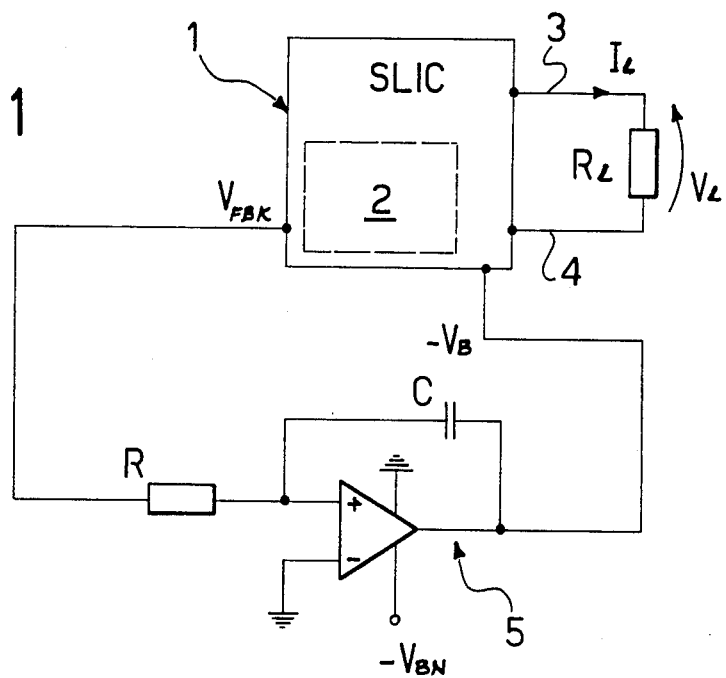
FIG. 1 shows a block diagram of a subscriber line interface circuit incorporating a control circuit according to the invention.

With reference to the drawing figures, generally designated 1 is a multifunctional Subscriber Line Interface Circuit, also referred to as SLIC circuit, intended for connection to a subscriber line for transmission of audio signals of the analog kind and incorporating, in accordance with this invention, a control circuit 2 to be explained in detail hereinafter.

Said subscriber line is schematically indicated by leads 3 and 4 being connected to a line load consisting of a resistor $R_L$ through which a line current $I_L$ is flown and across which a line voltage $V_L$ is applied.

The interface circuit 1 is provided rwith a voltage regulator 5, connected thereto in negative feedback relationship, which includes an integrator having a time constant RC for stabilizing the supply voltage $V_B$ to the interface circuit 1. The voltage regulator 5 produces the voltage value of $V_B$, being in turn powered by a battery having a rated voltage value $V_{BN}$.

Figure 2:
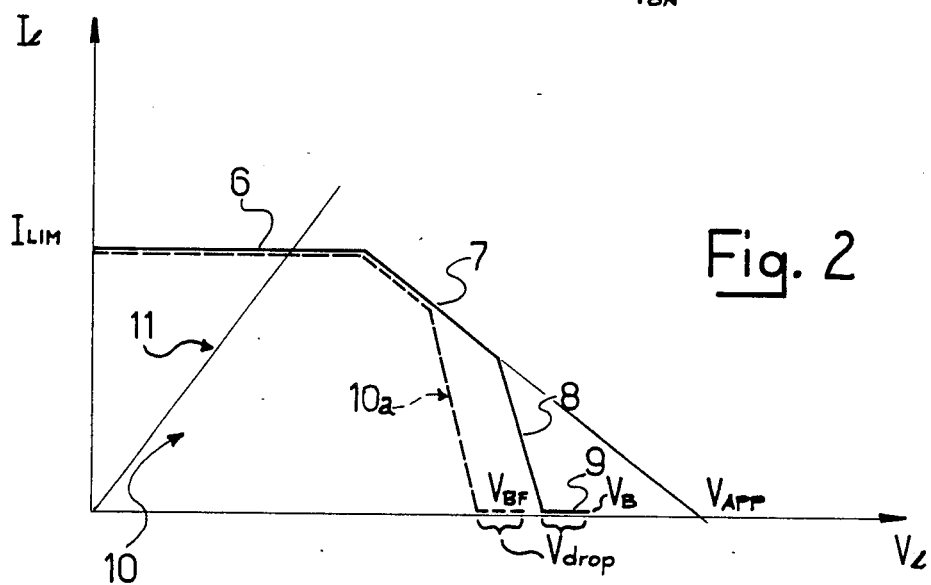
FIG. 2 shows a graph of the so-called line current $I_L$ characteristic plotted against the line voltage $V_L$ at the output terminals of the interface circuit shown in FIG. 1.

With particular reference to FIG. 2, there is shown the behavior of the line current/line voltage characteristic at the output terminals of the interface circuit 1, for DC operation and in the absence of transients.

The above-mentioned characteristic 10 can be plotted as a broken line with straight segments, of which a first segment, indicated at 6, is identified by a constant value of the line current $I_L$ equal to $I_{LIM}$, and a second segment 7, merging with the former, having a gradient of $1/R_{DC}$, where $R_{DC}$ is the bridge resistance of the interface circuit 1. A further sloping segment 8, merging with the preceding segment 7 and having a gradient of $n/R_{DC}$, where n is a positive integer, meets the axis of the line voltage values $V_L$ and merges with a straight segment 9 of the characteristic curve 10 whose length corresponds to the value $V_{drop}$ that denotes the least difference between the supply voltage $V_B$ and the line voltage $V_L$. The value of the parameter n of the sloping segment 8 is taken in a preferred embodiment as equal to infinity, thereby in this embodiment, the segment will lie vertical and parallel with the axis of the line current values $I_L$.

In FIG. 2, there is also shown a characteristic curve 10a in ghostline which is shifted in parallelism with the continuous segment of the characteristic curve 10 and is dependent on an optimum supply voltage value $V_{BF}$ supplied to the interface circuit 1 in accordance with this invention and discussed in more detail hereinafter.

Indicated at 11 is the so-called load line, led through the origin of the axes, whose gradient is dependent on the value of the line resistance $R_L$ and whose point of intersection with the characteristic curve 10 identifies the so-called cut-in point of the interface circuit 1.

Figure 3:
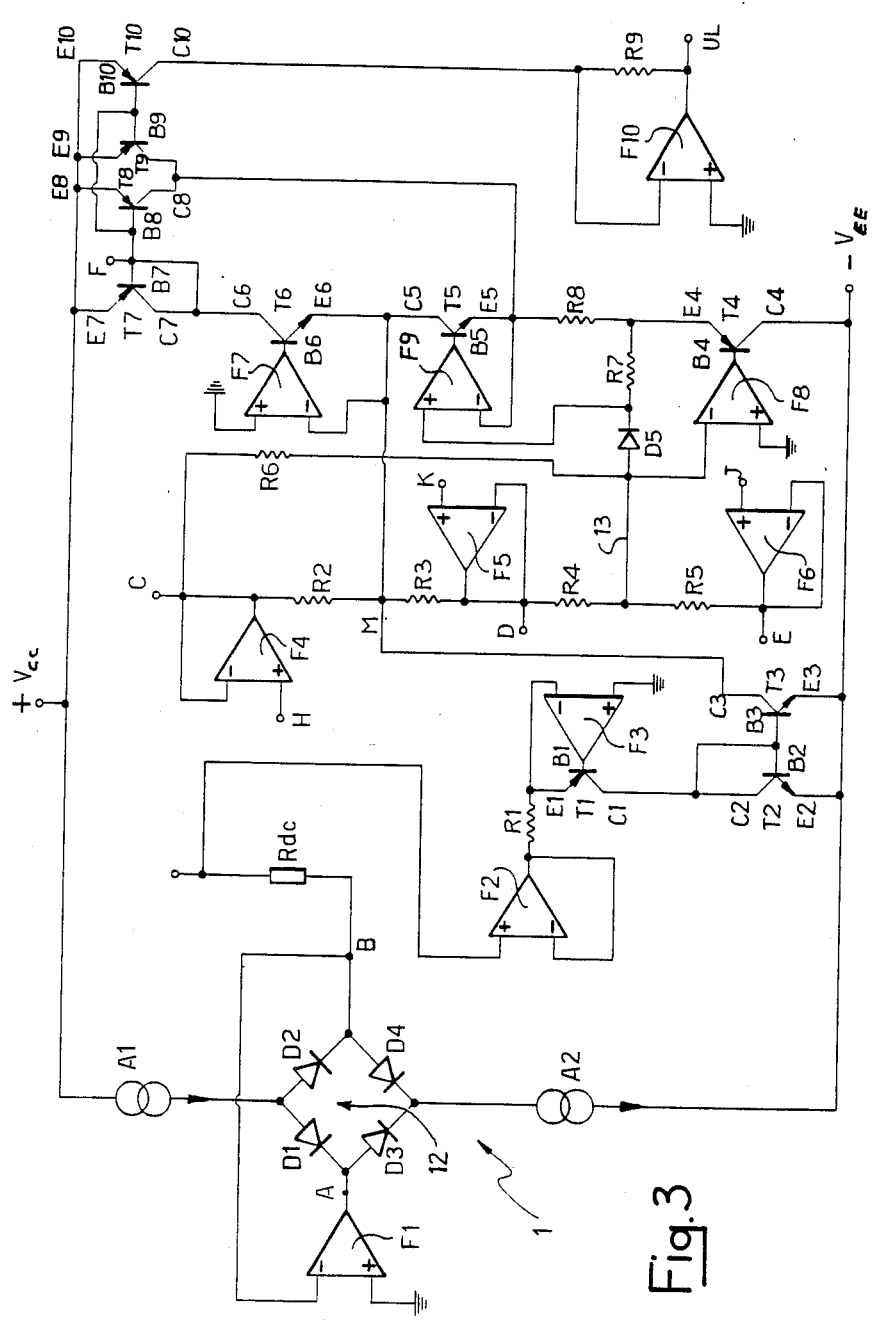
FIG. 3 is a wiring diagram of the interface circuit shown in FIG. 1.

With particular reference to the exemplary embodiment of FIG. 3, there is shown a wiring diagram of an interface circuit 1 of the so-called SLIC type, which comprises a bridge arrangement 12 made up of diodes indicated at D1 to D4, with the diodes D1 and D2 being connected to the positive supply pole $V_{CC}$ at 5 Volts via a current source A1, and the diodes D3 and D4 being connected to the negative supply pole $-V_{EE}$ at $-5$ Volts via a current source A2.

The circuit nodes for interconnection of the diodes D1, D3 and diodes D2,D4 in the bridge arrangement 12 are designated A and B, respectively. The node A is connected to the output of an operational amplifier F1 having its non-inverting input grounded, whereas the node B is connected to the inverting input of the operational amplifier F1 and to one end of the bridge resistance $R_{DC}$, the other end whereof is connected to both the non-inverting input of an operational amplifier F2 and to a source of a current whose value is equal to the line current $I_L$, omitted from the drawings.

The nodes A and B respectively form terminals for connection to the inputs of a first circuit portion 18 of the control circuit 2.

The operational amplifier F2 has its output fed back to its inverting input, and connected via a resistor R1 to both the emitter E1 of a transistor T1 and the inverting input of an operational amplifier F3 having its non-inverting input grounded and its output connected to the base B1 of the transistor T1.

The transistor T1 is of the pnp type with its collector C1 connected to the collector C2 of a transistor T2 of the npn type having its emitter E2 connected to the negative supply pole $-V_{EE}$ and its base B2 connected to the collector C2 as well as to the base B3 of an npn transistor T3 having the emitter E3 connected to the negative pole $-V_{EE}$ and the collector C3 connected to a circuit node indicated at M.

To said node M there are respectively connected one end of a resistor R2, one end of a resistor R3, and the inverting input of an operational amplifier F7. The other end of said resistor R2 is connected to a terminal indicated at C, whereto the output and the inverting input of an operational amplifier F4 are also connected; the operational amplifier F4 has its non-inverting input supplied with a voltage value proportional to $-V_B$ at the terminal H.

The other end of said resistor R3 is connected to a terminal denoted D, whereto the output and inverting input of an operational amplifier F5 are also connected, the non-inverting input of said operational amplifier F5 being applied a voltage value which is proportional to the apparent battery voltage $V_{APP}$ at the terminal K.

Connected to said terminal D is also one end of a resistor R4 which is connected with the other end to a resistor R5, in turn connected to a terminal denoted E to which the output and inverting input of an operational amplifier F6 are also connected, the non-inverting input of said operational amplifier F6 being applied a voltage proportional to $V_{drop}$, the least difference between the supply voltage $V_B$ and the line voltage $V_L$, at the terminal J.

From said resistors R4 and R5 there departs a lead 13 which is both connected to said terminal C via a resistor R6 and to the inverting input of an operational amplifier F8 having its non-inverting input grounded. The operational amplifier F8 has its output connected to the base B4 of a pnp transistor T4 having the collector C4 connected to the negative pole $-V_{EE}$ and the emitter E4 connected to the emitter E5 of an npn transistor T5 via a resistor R8.

To the above-mentioned lead 13, there are connected both the non-inverting input of an operational amplifier via a diode D5 and said emitter E4 of the transistor T4 via a resistor R7.

The operational amplifier F9 is connected at its output to the base B5 of said transistor T5, and at its inverting input, to said emitter E5. The collector C5 of the transistor T5 is connected to the circuit node M and to the inverting input of the operational amplifier F7 as well as to the emitter E6 of an npn transistor T6 having its base B6 connected to the output of the operational amplifier F7, with the non-inverting input to ground, and its collector C6 connected to the collector C7 of a pnp transistor T7 having the emitter E7 connected to the positive supply pole $V_{CC}$. The transistor T7 has its base B7 and connector C7 connected together, the base B7 also forming a further terminal, designated F, of the interface circuit 1 for connection to the control circuit 2.

The base B7 of the transistor 17 is connected electrically to both bases B8 and B9 of a transistor pair T8,T9 of the pnp type having their respective emitters E8 and E9 connected to the positive supply pole $V_{CC}$ and collectors C8 and C9 connected together and to the emitter E5 of the transistor T5.

A further pnp transistor T10 has its base B10 connected to the base B9 of the transistor T9 and its emitter E10 connected to the positive pole $V_{CC}$.

The collector C10 of the transistor T10 is connected to the inverting input of an operational amplifier F10 having its non-inverting input grounded and its output and inverting input connected via a resistor R9; the output of the operational amplifier F10 also forms an output terminal, denoted UL, for the interface circuit 1.

Figure 4:
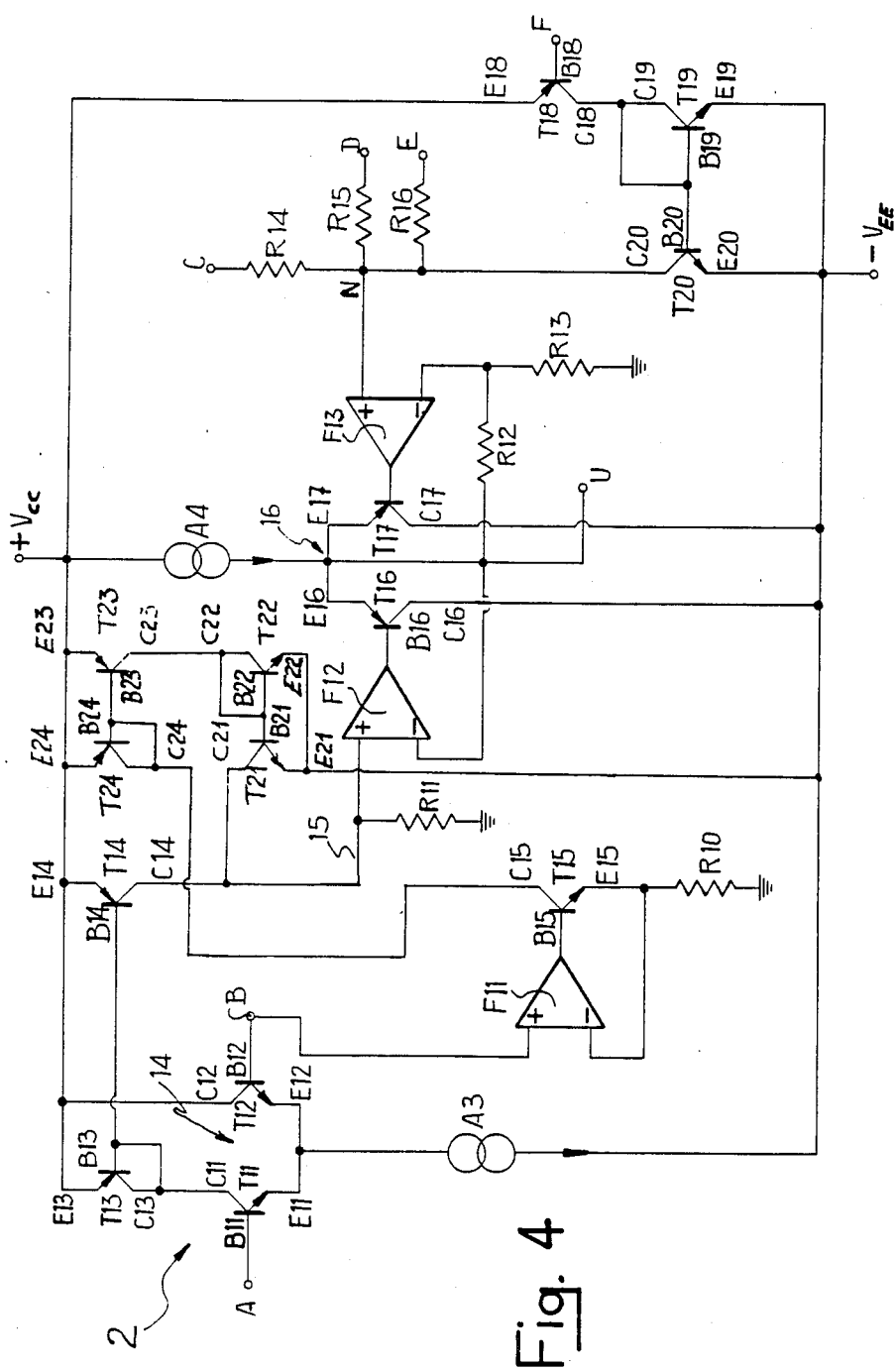
FIG. 4 is a wiring diagram of the control circuit shown in FIG. 1.

Advantageously according to the invention, the terminals of the interface circuit 1, as previously specified and identified by characters from the alphabet letters progressively from A to F, form points of connection of said interface circuit 1 to the control circuit 2. In particular in the embodiment shown in FIG. 4, the wiring diagram drawn for said control circuit 2 includes a first circuit portion (18) having first and second inputs respectively connected to said terminals A and B. This first circuit portion (18) comprises a first differential cell 14 formed of transistors T11 and T12 of the npn type which have their respective bases B11 and B12 connected to the terminals A and B, respectively, of the interface circuit 1.

The differential cell 14 has the emitters E11 and E12 of the transistors T11 and T12 connected together and to the negative supply pole $-V_{EE}$ via a current source A3. The collector C11 of the transistor T11 is connected to the collector C13 of a pnp transistor T13 having its emitter E13 connected to the positive supply pole $V_{CC}$ and its base B13 connected to the collector C13 and the base B14 of a further transistor T14 of the pnp type, having in turn its emitter E14 connected to the supply $V_{CC}$. The collector C14 of the transistor T14 is both connected to ground through a resistor R11 and to the non-inverting input of an operation amplifier F12, as well as to the collector C21 of an npn transistor T21 in a pair of biasing transistors also including an npn transistor T22 which has its base B22 connected directly to the base B21 of the preceding transistor T21. Both transistors, T21 and T22, have their emitters E21 and E22 connected to the negative pole $-V_{EE}$. The collector C22 of the transistor T22 is connected directly to the base B22 and to the collector C23 of a pnp transistor T23 included to a second pair of biasing transistors for a transistor T15 as explained hereinafter.

The transistor T23 has its emitter E23 connected to the positive pole $V_{CC}$ and its base B23 connected directly to the base B24 of a pnp transistor T24 having the emitter E24 connected to the positive pole $V_{CC}$ and the collector C24 connected to both the base B24 and the collector C15 of the transistor T15 of the npn type which has its emitter E15 grounded through a resistor R10.

Said terminal B of the interface circuit 1 is also connected to the non-inverting input of an operational amplifier F11, which has the output connected directly to the base B15 of said transistor T15 and has the inverting input connected to the emitter E15.

The aforementioned operational amplifier F12 has its output connected to the base B16 of a pnp transistor T16, which forms a differential cell 16 in cooperation with a like transistor T17, these transistors having their emitters E16 and E17, respectively, connected together and to the positive supply pole $V_{CC}$ through a current source A4.

Both transistors, T16 and T17, have their respective collectors, C16 and C17, connected directly to the negative supply pole $-V_{EE}$.

The operational amplifier F12 has, moreover, its inverting input connected directly to the point of contact between the emitters E16 and E17, whence an output terminal designated U also branches off. The first circuit portion of the control circuit discussed above is constructionally and operationally independent of a remaining second circuit portion, described herein below, which is also led to the output terminal U.

To the base B17 of the transistor T17 there is connected directly the output of the operational amplifier F13, which has its inverting input connected both to said output terminal U through a resistor R12 and to ground through a resistor R13.

The non-inverting input of said operational amplifier F13 is connected to a circuit node, indicated at N, to which there are respectively connected the terminal C through a resistor R14, the terminal D through a resistor R15, and the terminal E through a resistor R16.

Thus, the terminals C, D and E provide, respectively, first, second, and third inputs to said second circuit portion (19) of the control circuit 2.

The terminal F is instead connected, as a fourth input, directly to the base B18 of a pnp transistor T18 forming a complementary pair with an npn transistor T19 through the connected collectors C18 and C19. The transistor T18 has its emitter E18 connected to the pole $V_{CC}$, whilst the transistor T19 has its emitter E19 connected to the negative pole $-V_{EE}$; the collector C19 is also connected to the base B19, the latter being also connected directly to the base B20 of an npn transistor T20 whose emitter E20 is connected to the negative pole $-V_{EE}$ and whose collector C20 is connected to the aforementioned circuit node N.

The operation of the interface circuit 1 incorporating the control circuit of this invention will be now described.

As is known, the cut-in point of the interface circuit 1 is identifiable by the point of intersection of the line current/line voltage characteristic curve 10 for the interface circuit and the so-called load line 11, the gradient whereof is tied to the value of the lin,e resistance load $R_L$.

That point of intersection affords a means of finding out the cut-in point, and hence the line current $I_L$ and line voltage $V_L$ values being applied to the subscriber line by the interface circuit 1.

Where said cut-in point falls within that segment of the characteristic curve 10 which is under a steady current equal to the peak current, then the first circuit portion (18) of the control circuit 2 will be operative.

The first circuit portion (18) of the control circuit 2 will, by picking up a voltage from the first input A, produce at the collector C14 of the transistor T14 a current value which is proportional to the difference between the line peak current $I_{LIM}$ and the line current $I_L$. Likewise, by picking up a voltage from the second input B, there is produced at the collector C15 of the transistor T15 a current value which is proportional to the voltage value obtained by multiplying the line peak current $I_{LIM}$ by the difference of the values of an apparent resistance $R'_{DC}$ minus the bridge resistance $R_{DC}$ of the interface circuit 1, where $R'_{DC}$ is an apparent resistance value dependent on the line voltage $V_L$.

To the non-inverting input of the operational amplifier F12 there will be applied, accordingly, a voltage value equal to the difference of an optimum voltage $V_{BF}$ minus the supply voltage $V_B$, in accordance with the following relation:

$$V_{BF} - V_B = (I_{LIM} - I_L)\frac{R_{DC}}{n} - (R'_{DC} - R_{DC})I_{LIM}$$

The differential cell 16 applies, to the output terminal U of the control circuit 2, the lowest of the voltage values which are being output to the operational amplifiers F12 and F13, each respectively for the first (18) and second (19) circuit portions of the control circuit 2.

The second circuit portion (19) of the control circuit 2, by respectively picking up: from the input terminal C a proportional voltage to the supply voltage $-V_B$; from the input terminal B a proportional voltage to the apparent battery voltage $V_{APP}$; and from the input terminal E a proportional voltage to $V_{drop}$, the least difference between the supply voltage $V_B$ and the line voltage $V_L$; and from the input terminal F a suitable voltage to provide at the collector C18 of the transistor T18 a current value proportional to the difference between the supply voltage $V_B$ and the line voltage $V_L$, is apt to provide a voltage value at the circuit node N in agreement with the following relation, $$V_{BF} - V_B = V_{APP} + 3V_{drop} - V_B - 2(V_B - V_L)$$

This voltage value is applied to the non-inverting input of the operational amplifier F13.

The output terminal U of the control circuit 2 is adapted for connection to the voltage regulator 5, to thereby enable the interface circuit 1 to be supplied with an optimum voltage value $V_{BF}$ regardless of the line load conditions.

Figure 5:
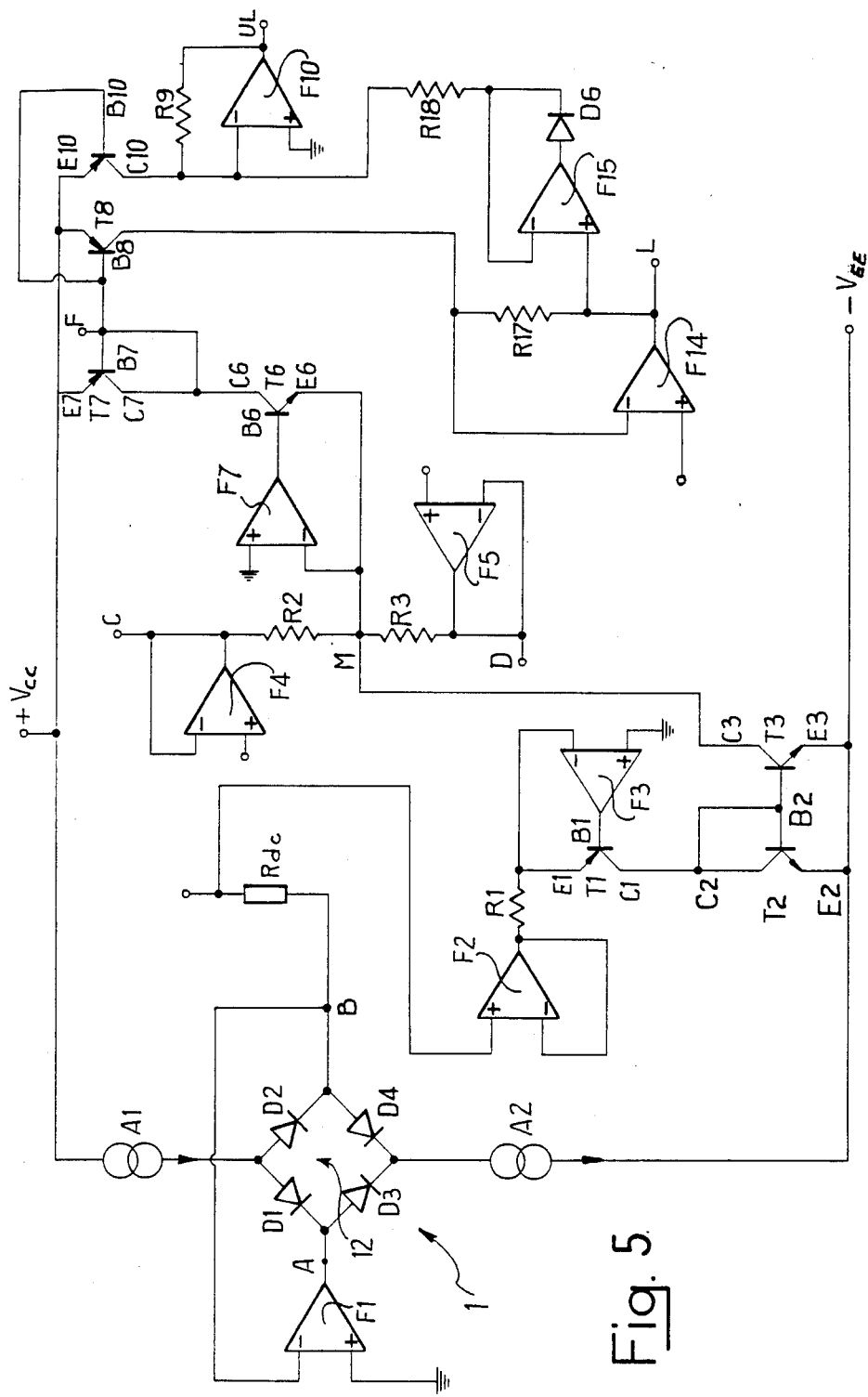
FIG. 5 shows the wiring diagram of a modified embodiment of the interface circuit shown in FIG. 1.

A modified embodiment of the interface circuit shown in FIG. 3 and according to this invention will be next described with particular reference to the embodiment of FIG. 5. For convenience of illustration, similar components in this embodiment to those shown in FIG. 3 are denoted by the same reference numerals and symbols.

This embodiment concerns an interface circuit of the SLIC type which exhibits at its output terminals a line current/line voltage characteristic curve the sloping segment 8 whereof, having a gradient of $n/R_{DC}$, lies vertical and parallel to the axis of the line currents in consequence of a value of the parameter n equal to infinity, being therefore a steady voltage segment.

In this variation, the transistor T8 of the interface circuit 1 has its collector C8 connected to an additional circuit portion (20), and specifically both to the inverting input of an operational amplifier F14 and to the output of the operational amplifier F14 through a resistor R17. The operational amplifier F14 also has its non-inverting input (21) connected to the interface circuit 1 by pick up of a proportional voltage to $V_{drop}$. The output of the operational amplifier F14 also forms an output terminal, designated L, for this modified embodiment, behind further connected to the non-inverting input of an operational amplifier F15 which has its output connected to the inverting input of the operational amplifier F10 in the interface circuit 1, via a diode D6 and a resistor R18. The operational amplifier F15 also has its inverting input connected between said diode D6 and said resistor R18.

Thus, where n=, the control circuit of this modified embodiment would be used which is effective to provide at the output terminal L a voltage value given by the following relation, $$V_{BF} - V_B = V_{APP} - B_B + V_{drop} - R_{DC} \times I_L.$$

This voltage value is again equal to the difference between an optimum voltage $V_{BF}$, to be supplied to the interface circuit, and said supply voltage $V_B$, and is accordingly input to the voltage regulator 5.

The control circuit of this invention makes it possible to power the interface circuit, through the voltage regulator 5, in any line load conditions with an optimum minimal voltage $V_{BF}$, while minimizing power dissipation.

In the instance of a SLIC interface circuit whose DC characteristic curve comprises just the limited current $I_{LIM}$ straight segment, it will be sufficient to merely implement the first portion (18) of the control circuit 2.

By contrast, with a SLIC circuit whose DC characteristic curve just comprises the sloping segment with gradient of $1/R_{DC}$, it will be sufficient to implement the second circuit portion (19) of the control circuit 2.

The control circuit of this invention affords the additional advantage of having a very slow time constant in the regulating loop, which allows changes in the optimum supply voltage $V_{BF}$ in the presence of decade numbering to be reduced.

I claim:

1. A control circuit for a voltage regulator in a subscriber line interface circuit which has output terminals connected to the subscriber line and having, in their steady-state condition, a so-called line current/line voltage characteristic described by a continuous straight segment function wherein a first segment at a steady current equal to the line peak or upper limit current ($I_{LIM}$) merges with a second sloping segment merging, in turn, with a third sloping segment, the gradients of said segments being dependent on the value of a bridge resistance ($R_{DC}$) in the interface circuit, and said characteristic depending on a supply voltage value ($V_B$) from said voltage regulator, characterized in that it comprises a first circuit portion connected to said interface circuit and having first (A) and second (B) inputs respectively connected to the bases of a transistor pair (T11, T12) in a differential cell effective to provide a voltage value proportional to the difference between said limit current ($I_{LIM}$) and said line current ($I_L$), to said second input (B) there being applied a voltage value proportional to said limit current ($I_{LIM}$) multiplied by the difference of a value of an apparent resistance ($R'_{DC}$) minus said bridge resistance ($R_{DC}$), and an output terminal (U) effectively providing a voltage value proportional to the difference between an optimum voltage ($V_{BF}$) to be applied to said interface circuit and said supply voltage ($V_B$) and being dependent on the voltage values appearing at said inputs.

2. A control circuit for a voltage regulator in a subscriber line interface circuit which has output terminals connected to the subscriber line and having, in their steady-state condition, a so-called line current/line voltage characteristic described by a continuous straight segment function wherein a first segment at a steady current equal to the line peak or upper limit current ($I_{LIM}$) merges with a second sloping segment merging, in turn, with a third sloping segment, the gradients of said segments being dependent on the value of a bridge resistance ($R_{DC}$) in the interface circuit, and said characteristic depending on a supply voltage value ($V_B$) from said voltage regulator, characterized in that it comprises a second circuit portion having a first input (C) where a voltage value appears which is proportional to said supply voltage ($V_B$), a second input (D) where a voltage value appears which is proportional to the apparent battery voltage ($V_{APP}$), a third input (E) where a voltage value ($V_{drop}$) appears which is proportional to the least difference said supply voltage and said line voltage ($V_L$), and a fourth input (F) connected to the base (B18) of a transistor (T18) effective to provide at its collector (C18) a proportional voltage to the value of the difference between said supply voltage ($V_B$) and said line voltage ($V_L$), and an output terminal (U) effective to provide a proportional voltage value to the difference of an optimum voltage ($V_{BF}$) to be applied to said interface circuit minus said supply voltage and dependent on the voltage values appearing at said inputs.

3. A control circuit for a voltage regulator in a subscriber line interface circuit which has output terminals connected to the subscriber line and having, in their steady-state condition, a so-called line current/line voltage characteristic described by a continuous straight segment function wherein a first segment at a steady current equal to the line peak or upper limit current ($I_{LIM}$) merges with a second sloping segment merging, in turn, with a third sloping segment, the gradients of said segments being dependent on the value of a bridge resistance ($R_{DC}$) in the interface circuit, and said characteristic depending on the supply voltage value ($V_B$) from said voltage regulator, characterized in that it comprises a first circuit portion connected to said interface circuit and having first (A) and second (B) inputs respectively connected to the bases of a transistor pair (T11,T12) in a differential cell effective to provide a voltage value which is proportional to the difference between said limit current ($I_{LIM}$) and said line current ($I_L$), at said second input (B) there appearing a voltage value which is proportional to said limit current ($I_{LIM}$) multiplied by the difference of a value of an apparent resistance ($R'_{DC}$) minus said bridge resistance ($R_{DC}$), and an output terminal (U) effective to provide a voltage value which is proportional to the difference between an optimum voltage ($V_{BF}$) to be applied to said interface circuit, and said supply voltage ($V_B$) and dependent on the voltage values appearing at said inputs; a second circuit portion having a first input (C) whereat a voltage value appears which is proportional to said supply voltage ($V_B$), a second input (D) whereat a voltage value appears which is proportional to the apparent battery voltage ($V_{APP}$), a third input (E) whereat a voltage value ($V_{drop}$) appears which is proportional to the least difference between said supply voltage and said line voltage ($V_L$), and a fourth input (F) connected to the base (B18) of a transistor (T18) effective to provide at its collector (C18) a current value which is proportional to the value of the difference between said supply voltage ($V_B$) and said line voltage ($V_L$), and an output terminal (U) effective to provide a voltage value which is proportional to the difference of an optimum voltage ($V_{BF}$) to be applied to said interface circuit, minus said supply voltage and dependent on the voltage values appearing at said inputs; means being provided to sense a minimum between said voltage values at each of said output terminals (U), said minimum voltage being input to said voltage regulator.

4. A control circuit according to claim 1, characterized in that said output terminal of said first circuit portion is effective to provide a voltage value which is proportional to the difference between said limit current ($I_{LIM}$) and said line current ($I_L$) minus the product of said limit current ($I_{LIM}$) by the difference between an apparent resistance value ($R'_{DC}$) dependent on said line voltage ($V_L$) and said bridge resistance ($R_{DC}$) of the interface circuit (1) divided through the value of a parameter n, where n is a positive integer.

5. A control circuit according to claim 2, characterized in that the output terminal of said second circuit portion is effective to provide a voltage value which is proportional to the sum of the values of said apparent battery voltage ($V_{APP}$) plus three times said least voltage difference ($V_{drop}$) between the battery and line voltages, minus the battery voltage value ($V_B$) and twice the difference between said battery voltage ($V_B$) and said line voltage ($V_L$), the proportionality ratio being determined by the inverse of a parameter n, where n is a positive integer.

6. A control circuit according to claim 1, characterized in that said first circuit portion (18) comprises first (A) and second (B) inputs respectively connected to the bases (B11,B12) of a transistor pair (T11,T12) in a differential cell, said second input (B) being connected to the non-inverting input of an operational amplifier (F11) having its output connected to the base (B15) of an npn transistor (T15) in a complementary pair which has its emitter (E15) grounded through a resistor (R10), the inverter input of said amplifier (F11) being connected to said emitter (E15), said complementary pair comprising a pnp transistor (T14) with its base (B14) connected to the collector (C11) of the transistor connected to said first input (A) in said differential cell, the collectors of said complementary pair being also connected both to the non-inverting input of an operational amplifier (F12) and to ground through a resistor (R11), said operational amplifier (F12) having an output connected to the base of a pnp transistor (T16) in a second differential cell and an inverting input connected to the output terminal (U) of the control circuit connected, in turn, to the emitters (E16,E17) of said second differential cell.

7. A control circuit according to claim 2, characterized in that said second circuit portion comprises an operational amplifier (F13) having a non-inverting input connected directly both to said first input (C) through a resistor (R14) and to said second input (D) through a resistor (R15), as well as to said third input (E) through a resistor (R16) and the collector (C20) of an npn transistor (T20) whose base and emitter are respectively connected to a base and emitter of an npn transistor (T19) having its collector (C19) connected to a collector (C18) of a pnp transistor (T18) which has its base (B18) connected to said fourth input (F), said operational amplifier (F13) also having an output connected to a base of a transistor (T17) in a differential cell and an inverting input both connected to ground through a resistor (R13) and to said output terminal (U) through a resistor (R12) of the control circuit, in turn connected to emitters of said differential cell.

8. A control circuit for a voltage regulator in a subscriber line interface circuit which has output terminals connected to the subscriber line and having, in their steady-state condition, a so-called line current/line voltage characteristic described by a continuous straight segment function wherein a a first segment (6) at a steady current equal to the line peak or upper limit current ($I_{LIM}$) merges with a second sloping segment (7) merging, in turn, with a third sloping segment (8), the gradients of said segments being dependent on the value of a bridge resistance ($R_{DC}$) in the interface circuit, and said characteristic depending on the supply voltage value ($V_B$) from said voltage regulator, characterized in that it comprises an additional circuit portion connected to said interface circuit and having a first input where a voltage value appears which is proportional to the apparent battery voltage ($V_{APP}$), a second input where a voltage value appears which is proportional to said supply voltage ($V_B$), at third input where a voltage value appears which is proportional to the least difference ($V_{drop}$) between said supply voltage ($V_B$) and said line voltage ($V_L$), and a fourth input where a voltage value appears which is proportional to the product of said line current ($I_L$) by an apparent resistance ($R'_{DC}$) of the interface circuit dependent on the value of said line voltage ($V_L$), and an output terminal effective to provide a voltage value which is proportional to the difference between an optimum voltage ($V_{BF}$) to be applied to said interface circuit, and said supply voltage ($V_B$) and dependent on the voltage values appearing at said inputs, said output voltage value being input to said voltage regulator.

9. A control circuit according to claim 8, characterized in that said output terminal of said circuit portion is effective to provide a voltage value equal to the sum of said apparent battery voltage ($V_{APP}$) plus said least difference ($V_{drop}$) between the supply voltage ($V_B$) and the line voltage ($V_L$), diminished by the sum of said supply voltage ($V_B$) plus said product of the line current ($I_L$) by said apparent resistance ($R'_{DC}$) dependent on the line voltage ($V_L$).

* * * * *